United States Patent [19]

Muller et al.

[11] Patent Number: 5,624,972
[45] Date of Patent: *Apr. 29, 1997

[54] MANUFACTURE OF POLYMERIC FOAMS

[75] Inventors: Louis Muller, Ottenburg; Tu Pham, Grez-Doiceau; Gabriel Verhelst, Herent, all of Belgium

[73] Assignee: Imperial Chemical Industries PLC, London, England

[*] Notice: The term of this patent shall not extend beyond the expiration date of Pat. No. 5,270,348.

[21] Appl. No.: 415,456

[22] Filed: Apr. 3, 1995

Related U.S. Application Data

[63] Continuation of Ser. No. 87,359, Jul. 8, 1993, Pat. No. 5,430,072, which is a continuation of Ser. No. 648,620, Feb. 1, 1991, abandoned.

[30] Foreign Application Priority Data

Feb. 1, 1990 [EP] European Pat. Off. ............... 9002240
Oct. 12, 1990 [EP] European Pat. Off. ............... 9022196

[51] Int. Cl.⁶ ............................................. C08G 18/10
[52] U.S. Cl. ............... 521/159; 521/160; 521/917; 264/51
[58] Field of Search ............... 521/159, 160, 521/917; 264/51

[56] References Cited

U.S. PATENT DOCUMENTS

| | | | |
|---|---|---|---|
| 4,234,693 | 11/1980 | Wooler | 521/107 |
| 4,261,852 | 4/1981 | Carroll et al. | 521/160 |
| 4,297,444 | 10/1981 | Gilbert et al. | 521/160 |
| 4,608,397 | 8/1986 | Reischl | 521/101 |
| 4,668,708 | 5/1987 | Mueller et al. | 521/159 |
| 5,070,114 | 12/1991 | Watts et al. | 521/159 |
| 5,270,348 | 12/1993 | Muller | 521/159 |
| 5,430,072 | 7/1995 | Muller et al. | 521/159 |

FOREIGN PATENT DOCUMENTS

| | | |
|---|---|---|
| 0005903 | 12/1979 | European Pat. Off. . |
| 0351852 | 1/1990 | European Pat. Off. . |
| 0361418 | 4/1990 | European Pat. Off. . |
| 0420273 | 4/1991 | European Pat. Off. . |
| 0442631 | 8/1991 | European Pat. Off. . |
| 128714/76 | 10/1970 | Japan . |
| 874430 | 8/1961 | United Kingdom . |
| 957748 | 5/1964 | United Kingdom . |
| 1429711 | 3/1976 | United Kingdom . |

OTHER PUBLICATIONS

J. Saunders & K. Frisch; "Polyurethanes;" 1962; pp. 30–31.
Polyurethane Pump Metering Teck.; PUR RIM Palette; Kraus Maffei Product Lit.; Oct. 1988.
Polyurethane Technology; Cannon Product Literature Mar., 1983.

*Primary Examiner*—Rachel Gorr
*Attorney, Agent, or Firm*—Cushman Darby & Cushman Intellectual Property Group of Pillsbury Madison & Sutro, LLP

[57] ABSTRACT

A method for the preparation of flexible polymeric foam by reacting a polyisocyanate component with an isocyanate-reactive component comprising at least 50% by weight of water, the polyisocyanate component comprising at least two polyisocyanate compositions, one of them being a low NCO isocyanate terminated prepolymer and the second being a high NCO polyisocyanate.

12 Claims, No Drawings

MANUFACTURE OF POLYMERIC FOAMS

This is a continuation of application Ser. No. 8/087,359, filed Jul. 8, 1993 now allowed as U.S. Pat. No. 5,430,072; which was a continuation of application Ser. No. 07/648,620 filed Feb. 1, 1991, now abandoned.

This invention relates to polymeric foams and more especially to polymeric foams derived from organic polyisocyanates and to a method for their preparation.

The production of foamed materials based on polyurethane and other polymer systems derived from organic polyisocyanates is well established. Depending upon the formulations used in their manufacture, the products can vary in texture from the soft flexible foams used as cushioning materials to the rigid foams used as insulating or structural materials. Similarly, depending upon the amount of blowing agent used, products having densities varying between about 10 and about 1100 kg/m$^3$ can be made.

Flexible polyurethane foams have been manufactured for more than thirty years from organic polyisocyanates and polymeric polyols. Water, which reacts with isocyanates to form carbon dioxide (and urea linkages), has been employed as the principal blowing agent. The polyisocyanate most commonly used in the production of flexible foam has been tolylene diisocyanate (TDI) but recent years have seen an increasing use of diphenylmethane diisocyanates (MDI). Interaction between the polyisocyanate and the isocyanate-reactive components, the polyol and water, can be brought about in various ways. In the so-called "one-shot" process, the aforementioned materials are combined at room temperature in a single reaction step, the polyisocyanate reacting substantially simultaneously with the polyol and water to form the foam. At the other extreme is the prepolymer process which involves reacting the polyisocyanate with the polyol, usually at an elevated temperature, to form a prepolymer containing free isocyanate and then foaming the cooled prepolymer in a quite distinct reaction step by reacting it with water. Between these two extremes is the semi- or quasi-prepolymer method which involves reacting the polyisocyanate with a portion of the polyol to form a relatively low viscosity prepolymer which is subsequently reacted with the water and the remainder of the polyol.

All three of the above described techniques have been used in the manufacture of flexible foams. For most purpose, the one-shot method has been preferred since it permitted a wide range of foams having different densities and associated properties to be conveniently made from a small number of ingredients. A prepolymer, because of its fixed isocyanate content, has hitherto not been regarded as suitable for producing a range of foams of varying properties. In some respects, however, the prepolymer method offers important advantages over the one-shot process. Thus, solid polyisocyanates such as 4,4'-diphenylmethane diisocyanate cannot be used in the one-shot process whereas liquid prepolymers made therefrom are convenient to handle. In addition to their usefulness in providing liquid components, prepolymers frequently provide a more controllable and desirable balance of reactions than can be obtained with a corresponding one-shot system and so offer processing advantages.

A method has now been found for preparing flexible foams having different densities and associated properties, which makes use of the prepolymer technique.

The present invention thus provides a method for the preparation of a flexible polymeric foam by reacting 100 parts by weight of polyisocyanate component with from 1–20 parts by weight of isocyanate-reactive component comprising at least 40% by weight of water, which method comprises the steps of a) forming a homogenous mixture of at least two polyisocyanate components, at least one of which is an isocyanate-containing prepolymer having an NCO content of from 2 to 15% by weight, then b) mixing said polyisocyanate blend with said isocyanate-reactive component to form a creaming mixture, and c) placing said creaming mixture on a foaming and curing surface.

More particularly the invention provides a method for the preparation of a flexible polymeric foam which comprises reacting 100 parts by weight of a polyisocyanate component with from 1 to 20 parts by weight of an isocyanate-reactive component comprising at least 40% by weight of water, the rest of it being chain extenders, crosslinker and/or the usual additives used for polyurethane foam formation, in the substantial absence of halocarbon blowing agent, the polyisocyanate component comprising at least two polyisocyanate compositions, one of them being a low NCO isocyanate-terminated prepolymer and the second one being a high NCO polyisocyanate, for example tolylene diisocyanate or a methylene bridged-polyphenyl polyisocyanate.

Preferably 100 parts by weight of polyisocyanate component are reacted with 1–10 parts by weight of isocyanate-reactive component.

Preferably the isocyanate-reactive component comprises at least 50% by weight of water.

For certain applications the preferred water content of the isocyanate-reactive component may be at least 95% by weight.

The method according to this invention offers even greater advantages when using MDI.

Whilst indeed the lower volatility of MDI relative to TDI is an advantage from the industrial hygiene point of view, a limitation of MDI based flexible foam systems has been the difficulty experienced in producing low density foams (below 30 kg/m$^3$) without using auxiliary blowing agents, especially chlorofluorocarbons such as trichlorofluoromethane. This problem is aggravated by the use of the prepolymer process since this brings about a dilution of the isocyanate content of the MDI. In view of international agreement that the use of chlorofluorocarbons should be reduced, it is clearly undesirable that flexible foam formulations should contain significant amounts of such blowing agents.

It has now been found that according to the method of this invention chlorofluorocarbon-free flexible foams having low density, high resilience and high tear strength can be prepared from polyisocyanate components comprising MDI, using water as substantially the sole blowing agent under the conditions hereinafter described.

Accordingly, the present invention provides a method for the preparation of a flexible polymeric foam which comprises reacting 100 parts by weight of a polyisocyanate component with from 1 to 20 parts by weight of an isocyanate-reactive component comprising at least 40% by weight of water in the substantial absence of halocarbon blowing agent, whereas the polyisocyanate component comprises at least two diphenylmethane diisocyanate compositions, from 20 to 40% by weight of said polyisocyanate component consisting of methylene-bridged polyphenyl polyisocyanates or reacted residues thereof and from 80 to 60% by weight of said polyisocyanate component consisting of reacted residues of isocyanate-reactive species.

The expression "methylene-bridged polyphenyl polyisocyanates" used herein is to be regarded as referring to diphenylmethane diisocyanates and oligomers thereof such as are found in "crude" and "polymeric" MDI. The "reacted residues" referred to above are best described with reference to prepolymers obtained by reacting an isocyanate-reactive compound with a stoichiometric excess of MDI. Such a prepolymer will contain free MDI, residues of reacted MDI and residues of the reacted isocyanate-reactive compound.

It is also preferred, in fact, in accordance with this embodiment of the invention, that one of the diphenylmethane diisocyanate compositions which constitute the polyisocyanate component is an isocyanate-terminated prepolymer having an NCO content in the range from 2 to 15% by weight obtained by reacting an isocyanate-reactive polymer having an average nominal functionality of 2 to 8 and an average equivalent weight in the range from 500 to 5000 with a stoichiometric excess of a diphenylmethane diisocyanate composition.

Diphenylmethane diisocyanate compositions which may be used in the preparation of the prepolymer include "pure" MDI preferably containing at least 60% by weight of the 4,4'-isomer. Suitable isocyanates therefore include the substantially pure 4,4'-isomer and isomer mixtures containing not more than 40%, preferably not more than 30%, and more preferably not more than 20%, by weight of the 2,4'-isomer and not more than 5% by weight of the 2,2'-isomer. Other suitable diphenylmethane diisocyanate compositions include modified forms of these diphenylmethane diisocyanates, that is to say MDI containing at least 60% by weight of the 4,4'-isomer modified in known manner by the introduction of urethane, allophanate, urea, biuret, carbodiimide, uretonimine or isocyanurate residues. These so-called MDI variants particularly include uretonimine-modified MDI having NCO contents of at least 25% by weight and polyether-based prepolymers having NCO contents of at least 20% by weight.

Diphenylmethane diisocyanate compositions containing pure MDI and polymeric fillers may also be used in the preparation of the prepolymer. MDI compositions containing polymeric fillers have been described in the prior art and include polyurea dispersions in MDI and prepolymers based on MDI and polymer polyols containing dispersed polymer particles. In these products, it is generally preferred that the dispersed polymer particles have an average particles size of less than 50 microns.

Further diphenylmethane diisocyanate compositions which may be used in the preparation of the prepolymer include compositions containing polymethylene polyphenylene polyisocyanates. Thus, mixtures may be used containing at least 70% by weight of pure MDI and up to 30% by weight of the so-called crude MDI containing from 35 to 65% by weight of diisocyanates, the remainder being largely polymethylene polyphenylene polyisocyanates having isocyanate functionalities greater than 2. Mixtures may also be used of pure MDI and polymeric MDI compositions containing higher proportions (up to 100%) of the said higher functionality polyisocyanates.

Still further diphenylmethane diisocyanate compositions which may be used in preparing the prepolymer include mixtures of the above described MDI types and up to 20% by weight of another polyisocyanate or mixture of polyisocyanates. Other polyisocyanates which may be used in admixture with the MDI include aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanates and, especially, aromatic polyisocyanates such as tolylene and phenylene diisocyanates.

Whereas a preferred embodiment of the invention involves the use of methylene-bridged polyphenyl polyisocyanates as disclosed hereabove, it should be clear that the invention is applicable for other polyisocyanates, such as in particular aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanates and, especially, aromatic polyisocyanates such as tolylene and phenylene diisocyanates.

A particularly interesting embodiment of the invention involves the use of at least one polyisocyanate component comprising a low NCO MDI based prepolymer, as described above, together with at least one other polyisocyanate component comprising a high NCO tolylene diisocyanate composition.

Preferred tolylene diisocyanate compositions for use in this embodiment of the invention are the so-called TDI 80/20 (a 80:20 mixture of 2,4-tolylene diisocyanate and 2,6-tolylene diisocyanate), TDI 65/35 (a 65:35 mixture of 2,4-tolylenediisocyanate and 2,6-tolylenediisocyanate), and high -NCO prepolymers thereof.

The isocyanate-reactive polymer used in the preparation of the prepolymer has an average nominal functionality of 2 to 8. The term "nominal functionality" refers to the functionality, with respect to isocyanates, that an isocyanate-reactive polymer would be expected to have having regard to its monomeric components.

For example, a polyether prepared by the addition of propylene oxide to a glycol will have a nominal (hydroxyl) functionality of 2 although, in fact, its average functionality will be somewhat less than 2.

Thus, for a polyether polyol, the average nominal functionality is the average functionality (number of active hydrogen atoms) of the initiator or initiators used in its preparation.

The average nominal functionality of the isocyanate-reactive polymer is preferably 2 to 4, more preferably 2 to 3. Preferred average equivalent weights lie in the range from 750 to 5000, more particularly in the range from 1000 to 4000. Mixtures of two or more isocyanate-reactive polymers varying in functionality, equivalent weight and/or chemical constitution (end groups or backbone) may be used provided such mixtures conform to the average functionality and average equivalent weight criteria specified herein.

Isocyanate-reactive groups may be present in the isocyanate-reactive polymer include primary amino, secondary amino, thiol, carboxy, imino, enamino and, especially, hydroxyl groups.

Particularly important isocyanate-reactive polymers include polymeric polyols. Suitable polyols and methods for their preparation have been fully described in the prior art and, as examples of such polyols, there may be mentioned polyesters, polyester-amides, polythioethers, polycarbonates, polyacetals, polyolefins, polysiloxanes and, especially, polyethers.

Polyether polyols which may be used include products obtained by the polymerisation of a cyclic oxide, for example ethylene oxide, propylene oxide, butylene oxide or tetrahydrofuran in the presence, where necessary, of polyfunctional initiators. Suitable initiator compounds contain a plurality of active hydrogen atoms and include water and polyols, for example ethylene glycol, propylene glycol, diethylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Further particularly useful polyether polyols include polyoxypropylene diols and triols obtained by the simultaneous or sequential addition of ethylene and propylene oxides to di- or trifunctional initiators as fully described in the prior art. Random copolymers having oxyethylene contents of 10–80%, block copolymers having oxyethylene contents of from 2 to 30%, preferably from 5 to 25% and random/block copolymers having oxyethylene contents of up to 50%, based on the total weight of oxyalkylene units may be mentioned. Mixtures of the said diols and triols can be particularly useful. Other particularly useful polyether polyols include polytetra-methylene glycols obtained by the polymerisation of tetrahydrofuran. Particularly useful are also mixtures of polypropylene-polyethylene oxide polyols with up to 5% of another polyol, for example a polyalkylene oxide, a polyester polyol, a polycarbonate polyol, a polyacetal polyol or a polytetramethylene glycol.

Polyester polyols which may be used include hydroxylterminated reaction products of polyhydric alcohols such as ethylene glycol, propylene glycol, diethylene glycol, 1,4-butanediol, neopentyl glycol, 1,6-hexanediol, cyclohexane dimethanol, bis(hydroxy-ethyl) terephthalate, glycerol, trimethylolpropane, pentaerytritol or polyether polyols or mixtures of such polyhydric alcohols, and polycarboxylic acids, especially dicarboxylic acids or their ester-forming derivatives, for example succinic, glutaric and adipic acids or their dimethyl esters, sebacic acid, phthalic anhydride, tetrachlorophthalic anhydride or dimethyl terephthalate or mixtures thereof. Polyesteramides may be obtained by the inclusion of aminoalcohols such as ethanolamine in polyesterification mixtures. Polyesters obtained by the polymerisation of lactones, for example caprolactone, in conjunction with a polyol, or of hydroxy carboxylic acids such as hydroxy caproic acid, may also be used.

Polythioether polyols which may be used include products obtained by condensing thiodiglycol either alone or with other glycols, alkylene oxides, dicarboxylic acids, formaldehyde, amino-alcohols or aminocarboxylic acids.

Polycarbonate polyols which may be used include products obtained by reacting diols such as 1,3-propanediol, 1,4-butanediol, 1,6-hexanediol, diethylene glycol or tetraethylene glycol with diaryl carbonates, for example diphenyl carbonate, or with phosgene.

Polyacetal polyols which may be used include those prepared by reacting glycols such as diethylene glycol, triethylene glycol or hexanediol with formaldehyde. Suitable polyacetals may also be prepared by polymerising cyclic acetals.

Other polyols which may be used comprise dispersions or solutions of addition or condensation polymers in polyols of the types described above. Such modified polyols have been fully described in the prior art and include products obtained by the in situ polymerisation of one or more vinyl monomers, for example styrene and acrylonitrile, in polymeric polyols, for example polyether polyols, or by the in-situ reaction between a polyisocyanate and an amino- and/or hydroxy-functional compound, such as triethanolamine, in a polymeric polyol.

Other useful isocyanate-reactive polymers for preparing the prepolymers include polymeric polyamines, especially diamines and triamines, corresponding to the above described polymeric polyols. Suitable polyamines include products obtained by the reductive amination of polyether polyols as described, for example, in U.S. Pat. No. 3,654,370 or by the cyanoethylation of polyols followed by hydrogenation. Polyoxypropylene diamines and triamines and mixtures thereof are preferred. Also useful are polymers containing both amino and hydroxyl groups obtained by the partial amination of polyols.

Further isocyanate-reactive polymers which may be used in preparing the prepolymers include imino-functional polymers. Such polymers have been described in U.S. Pat. No. 4,794,129 together with methods for their preparation and include polymers terminating in imine, oxazoline, imidazoline, N-alkyl imidazoline, oxazine, diazine, iminoester, amidine, imidine, isourea and guanidine groups. The preferred imino-functional polymers are imine-terminated polyethers such as may be obtained, for example by reacting a polyether polyamine, especially a polyoxypropylene diamine or triamine, with an aldehyde or ketone.

Enamine functional polymers may be prepared either from secondary amine terminated resins (i.e. polyethers) by reaction with ketones/aldehydes having one or more alpha hydrogens, or by reacting ketone/aldehyde terminated resins (bearing alpha hydrogens) with secondary amines, providing for removal of the $H_2O$ formed in the reactions. Secondary amine terminated resins can be obtained, for example by catalytic hydrogenation of the imino-functional polymers described hereinabove. Ketone/aldehyde terminated resins may be obtained, in general, by oxidation of the corresponding secondary or primary hydroxyl terminated resin. More highly reactive enamine functional polymers can be prepared by oxidising a primary hydroxy functional resins to the corresponding polycarboxylic acid, conversion of the said groups to orthoesters, end treatment of the latter, with an excess of a secondary amine. Each orthoester must contain at least one alpha hydrogen atom.

The isocyanate-terminated prepolymer may be prepared by reacting the polyisocyanate composition with the isocyanate-reactive polymer under conditions that have been fully described in the prior art for the preparation of prepolymers. Reaction temperatures of about 40° to about 90° C. are generally suitable for the preparation of urethane group-containing prepolymers from polyols or urea group-containing prepolymers from polyamines but, if desired, the reaction may be continued under known conditions so as to convert urethane groups to allophanante groups and urea groups to biuret groups. They achieve a final NCO content within the range 2 to 15% by weight, an initial ratio of isocyanate to isocyanate-reactive groups (for example NCO/OH) would typically be within the range from 3:1 to 20:1. Preferred prepolymers are made by reacting the starting materials at an initial ratio of isocyanate to isocyanate-reactive groups in the range from 3.5:1 to 15:1, especially 4:1 to 10:1, to give prepolymers having NCO contents of 4 to 12%, especially 5 to 10% by weight.

In addition to the isocyanate-terminated prepolymer, the polyisocyanate component used in the method of the invention contains at least one other polyisocyanate composition. Polyisocyanate compositions which may be used in conjunction with the isocyanate-terminated prepolymer include aliphatic, cycloaliphatic and araliphatic polyisocyanates, especially diisocyanates, for example hexamethylene diisocyanate, isophorone diisocyanate, cyclohexane-1,4-diisocyanate, 4,4'-dicyclohexylmethane diisocyanate and m- and p-tetramethylxylene diisocyanates and, especially, aromatic polyisocyanates such as tolylene and phenylene diisocyanates. Preferred polyisocyanate composition for use in conjunction with the isocyanate terminated prepolymer are tolylene diisocyanates, methylene bridged polyphenyl polyisocyanates and diphenylmethane diisocyanates. Particularly preferred diphenylmethane diisocyanates include the various types of diphenylmethane diisocyanate compositions described above in relation to the preparation of the prepolymer provided they are liquids at the operating temperature. Thus, suitable compositions include MDI isomer mixtures, preferably containing at least 60% by weight of the 4,4'-isomer, MDI variants and crude or polymeric MDI. It is preferred that the prepolymer is used in conjunction with at least one diphenylmethane diisocyanate composition having an NCO content of at least 25%, especially at least 30%, by weight.

To effect foam formation, 100 parts by weight of the polyisocyanate-component is reacted with 1 to 20 parts by weight of the isocyanate-reactive component in the presence as necessary of conventional additives which may for convenience be included in the isocyanate-reactive component or, if inert towards isocyanates, in the polyisocyanate component or as an additional stream, and optionally in the presence of one or more further isocyanate reactive streams which comprise up to 25 parts by weight higher molecular weight polyols and/or polyamines.

In many cases, water will be the sole isocyanate-reactive species present in the isocyanate-reactive component. In addition to containing water, however, the isocyanate-reactive component may also contain up to 60% by weight of isocyanate-reactive compound(s) having an average equivalent weight below 500. Most preferably the isocyanate-reactive component consists for at least 50% of water, and for certain applications for at least 95%.

Suitable isocyanate reactive compound(s) having an average equivalent weight below 500 used as chain extenders or crosslinkers in this invention are polyfunctional isocyanate-reactive C4–C30 cycloaliphatic, aromatic or araliphatic species or combinations thereof. The isocyanate-reactive group is preferably a hydroxyl, an amino or an imino group.

Well-known chain extenders such as ethylene glycols, propylene glycols, dipropylene glycols, 1,4-butane diol, sugar derivatives such as sorbitol, monoethanolamine (MELA) or diethanolamine (DELA) have been found suitable for the purpose of the invention. Aliphatic diamino derivatives are also suitable and include 1,2-diaminoethane and amine-terminated polyethers of molecular weight below 1000.

According to one preferred embodiment of the invention there is used an amino chain extender having at least 2 amino groups of which at least one is directly attached to a cyclic hydrocarbon residue, of MW below 1000, preferably of MW in the range of 60 to below 1000.

Suitably employed as aliphatic and cycloaliphatic amines are isophorone diamine (1-amino-3-amino-3,5,5-trimethyl cyclohexane), fully hydrogenated di(aminophenyl)methane, piperazine, hydrogenated methylene dianiline, diamino menthane and hydrogenated toluene diamine. The most useful of these are those that are liquids below about 110 deg C.

Among aromatic diamines, diethyl toluene diamine is particularly preferred.

Preferred diamine polyols are Mannich derivatives of phenols or alkyl phenols, particularly Mannich condensates of phenol or phenol derivatives, formaldehyde and diethanolamine.

A most preferred Mannich derivative used as crosslinker is 2,5 bis (N,N-diethanolamine)-4-nonylphenol.

Suitable additives which can be present in the isocyanate-reactive component or, if inert towards isocyanates, in the polyisocyanate component include the catalysts commonly disclosed in the literature, such as for example tertiary amines and tin compounds, surface-active agents and foam stabilisers, for example siloxane-oxyalkylene copolymers, chain extenders, for example low molecular weight diols, diamines and diimines, crosslinking agents, for example triethanol-amine, flame retardants, organic and inorganic fillers, pigments and internal mould release agents. Since the method of the invention is to be performed in the substantial absence of halocarbon blowing agent, the foam formulation should contain less than 1%, preferably less than 0.5%, of halocarbon blowing agents, for example trichlorofluoromethane, so that less than 10% of the blowing is due to the halocarbon.

Higher molecular weight polyols and polyamines which may be present in optional further isocyanate-reactive streams include those polymeric polyols and polyamines described above for the preparation of the prepolymers according to the invention.

A preferred reaction system for use in the method of the invention comprises:

A) an isocyanate-terminated prepolymer having an NCO content in the range from 2 to 15% by weight obtained by reacting an isocyanate-reactive polymer having an average nominal functionality of 2 to 4 and an average equivalent weight in the range from 500 to 5000 with a stoichiometric excess of a diphenylmethane diisocyanate composition, B) a diphenylmethane diisocyanate composition having an NCO content of at least 20% by weight, and C) an isocyanate-reactive component containing at least 40% by weight of water, the weight ratio of A to B being in the range from 2.3:1 to 100:1, A+B together containing from 20 to 40% by weight of methylene-bridged polyphenyl polyisocyanates or reacted residues thereof and from 80 to 60% by weight of reacted residues of isocyanate-reactive species and the weight ratio of A+B to C being in the range from 100:5 to 100:1.

A most preferred reaction system for use in the method of the invention comprises:

A) an isocyanate-terminated prepolymer having an NCO content in the range from 2 to 15% by weight obtained by reacting a polypropylene-polyethylene oxide polyol having a oxyethylene content varying between 2 and 30% by weight and having an average nominal functionality of 2 to 6 and an average equivalent weight in the range from 500 to 5000 with a stoichiometric excess of a diphenylmethane diisocyanate composition, B) a diphenylmethane diisocyanate composition or a TDI composition having an NCO content of at least 25% by weight, and C) an isocyanate-reactive component containing at least 40% by weight of water, the weight ratio of A to B being in the range from 2.3:1 to 100:1, A+B together containing from 20 to 40% by weight of polyisocyanates or reacted residues thereof and from 80 to 60% by weight of reacted residues of isocyanate-reactive species and the weight ratio of A+B to C being in the range from 100:1 to 100:1.

The use of at least two polyisocyanate streams which are combined at or before the mixing head, one stream comprising a prepolymer as described above having an NCO content of 2 to 15% by weight and an other having an NCO content of at least 25% preferably at least 30%, by weight confers upon the method of the invention a flexibility of formulation comparable with that of the one-shot process. Thus, starting from a given formulation, foams of lower density can be prepared by increasing the water content of the reaction mixture and/or making a corresponding increase in the input of the isocyanate stream having the higher NCO content.

In carrying out the invention it is most appropriate to form a homogeneous mixture of the isocyanate containing ingredients prior to its reaction with water to form a creaming mixture.

The homogeneous liquid mixture is created by metering specific amounts of isocyanate containing ingredients into a mixing zone at controlled rates to produce the desired weight ratio of prepolymer to other isocyanate containing components. Preferably this mixing zone involves high shear mixing. Each isocyanate reactant is fed into the mixing zone as a separate metered stream using appropriate liquid metering pumps from a storage tank. If necessary, the storage tanks and pumping systems may be heated such that the isocyanate components entering the mixing zone are at the desired viscosity and temperature, after which mixing they may be fed into a reaction zone to react with the aqueous component to form the desired foam. In most instances, only two metered streams are required for the isocyanate components. However, it is contemplated that three or more are feasible. Alternatively, unheated isocyanate reactants may be added to a heated mixing zone.

The mixing zone can suitably be an appropriately shaped container having high shear mixing. The container can suitably be a closed cylinder having a multiplicity of entrance ports which are preferably diametrically opposed such that the advantage of impingement mixing is realised in addition to the mixing forces applied by high shear mixing blades, rotating therein.

High shear mixing forces are usually provided by appropriately shaped mixing blades rotating at high speeds and located at the centre of the mixing zone. In addition to the isocyanate other additives may be incorporated at the mixing zone such as catalysts, surfactants, colouring agents, stabilisers and the like.

After mixing for a finite period of time to form a homogeneous mix, the isocyanate blend may be temporarily stored in a holding zone or transferred instantly to a reaction zone where it is mixed with the aqueous component to form the creaming mixture.

The reaction zone may be an adjacent portion of the mixing container or a separate container. A preferred mixing device comprises an elongated cylindrical container having high shear mixing blades mounted on a rotating shaft passing the length of the cylinder. The diameter and length of the cylindrical mixing device is sized appropriately to match the feed rate, holdup time and cream time required. Multiple feed ports are positioned at one end of the container to receive unmixed isocyanates and other additives while an exit port is located at the opposite end of the container to emit creaming mixture. A midpoint feed port is positioned in the cylinder to add water. The positioning of the water feed point is appropriately fixed by the feed rate, hold time and cream time desired before the foaming ingredients are placed in the mould.

The method of the invention is used to produce moulded or slabstock foam by mixing the prepolymer containing components of the foam-forming reaction mixture continuously or semi-continuously with water blowing ingredients.

The invention is illustrated but not limited by the following examples in which all parts and percentages are by weight unless otherwise stated.

The following glossary of materials is included to identify reaction components not otherwise identified in the examples.

GLOSSARY

MDI Polyisocyanate A is a prepolymer (NCO=6.7%) obtained by reacting 750 parts of an ethylene oxide tipped polyoxpropylene triol (OH No.=32) with 250 parts of an 80/20 mixture of 4,4'-and 2,4'-MDI.

MDI Polyisocyanate B is a blend of 80 parts of crude MDI and 20 parts of an 80/20 mixture of 4,4'-and 2,4'-MDI. The NCO content is 32%.

MDI Polyisocyanate C is a modified MDI derivative having an NCO content of 28% (commercialised by ICI under the name SUPRASEC VM 27).

MDI Polyisocyanate D is a prepolymer containing dispersed urea particles (NCO=7%) obtained by reacting 752 parts of the above mentioned polyether triol with 321 parts of an 80/20 mixture of 4,4'-and 2,4'- MDI and 28 parts of isophorone diamine.

MDI Polysocyanate E is a prepolymer (NCO=6.5%), prepared by reacting at 80 deg C. 25.7 pbw methylene diphenyldiisocyanate containing 10% of 2,4' isomer with 55.9 pbw of a propylene oxide/ethylene oxide (weight ratio 87/13) polyether triol of OH-value 36, and with 18.4 pbw of a propylene oxide/ethylene oxide polyether triol of OH-value 42, having a random PO/EO distribution in a weight ratio of about 25/75.

The product has a viscosity of 7500 cPs at 25 deg C. The overall ethylene oxide content was about. 28% on the basis of the total oxyalkylene residues.

MDI Polyisocyanate F is a prepolymer (NCO=5.9%), prepared by reacting 26.8 pbw of methylene diphenyldiisocyanate containing 10% of 2,4% isomer, with 73.2 pbw of a propylene oxide/ethylene oxide polyether triol of OH-value 38, content of ethylene oxide being 10.9% by weight as tipping.

The product has a NCO content of 5.9% and a viscosity of 26000 cPs at 25 deg C.

Polyisocanate G: a mixture of 50 pbw of TDI 80-20 and 50 pbw of polymeric MDI (Suprasec DNR), having a total NCO content of 40%.

Suprasec DNR: a commercially available polymer MDI available from Imperial Chemical Industries PLC.

Niax A-1 is a catalyst available from Union Carbide.

Dabco 33LV is a catalyst available from Air Products.

Tegostab B4113 is a silicone surfactant available from Goldschmidt AG.

SC-104 is a surfactant available from BP Chemicals.

EXAMPLES 1–5

Preparation of flexible foams.

In these examples the following hand mix procedure has been followed.

The isocyanate component was first prepared by blending the polyisocyanates as indicated in the tables of the examples. The isocyanate-reactive component was then prepared by premixing the water and the additives stated in the tables of the examples for 15 seconds at 1500 RPM. The isocyanate component was then added with a further 5 second mixing at 2000 RPM.

The mixtures were poured in 5 litre polyethylene buckets. The foam was allowed to cure for 24 hours. Pads of 10×10×5 cm were then cut from the centre of the bun for physical testing.

Example 1

| Low density soft foam | |
|---|---|
| Isocyanate component: | |
| MDI-Polyisocyanate A | 80 pbw |
| MDI-Polyisocyanate B | 10 pbw |
| MDI-Polyisocyanate C | 10 pbw |
| Isocyanate-reactive component: | |
| Water | 4,8 pbw |
| Niax A-1 | 0,20 pbw |
| Dabco 33LV | 0,10 pbw |
| Tegostab B4113 | 0,10 pbw |
| Diethanolamine | 0,10 pbw |
| Physical properties: | |
| Foam density (core) (kg/m$^3$) [ISO R1855] | 21 |
| Compression Hardness: | |
| CV 40% (kPa) [ISO 3386) | 1,8 |

Example 2

| Medium density firm foam | |
|---|---|
| Isocyanate component: | |
| MDI-Polyisocyanate A | 90 pbw |
| MDI-Polyisocyanate B | 10 |
| Isocyanate-reactive component: | |
| Water | 3,8 |
| Niax A-1 | 0,15 |
| Dabco 33LV | 0,05 |
| Tegostab B4113 | 0,10 |
| Physical properties: | |
| Foam density (core) (kg/m³) [ISO R1855] | 36 |
| Compression Hardness: | |
| CV 40% (kPa) [ISO 3386] | 2,4 |

Example 3

| High density hard foam | |
|---|---|
| Isocyanate component: | |
| MDI-Polyisocyanate C | 10 pbw |
| MDI-Polyisocyanate D | 90 |
| Isocyanate-reactive component: | |
| Water | 3,2 |
| Niax A-1 | 0,10 |
| Dabco 33LV | 0,15 |
| SC-104 | 0,05 |
| Physical properties: | |
| Foam density (core) (kg/m³) [ISO R1855] | 43 |
| Compression Hardness: | |
| CV 40% (kPa) [ISO 3386] | 3,5 |

Example 4

| Isocyanate component: | |
|---|---|
| MDI-Polyisocyanate E | 90 pbw |
| Suprasec DNR | 10 pbw |
| Isocyanate-reactive component: | |
| Water | 1.98 pbw |
| Niax A-1 | 0.1 pbw |
| Density (ISO 1855) | 63 kg/m³ |

Example 5

| Isocyanate component: | |
|---|---|
| MDI-Polyisocyanate F | 90 pbw |
| Suprasec DNR | 10 pbw |
| Isocyanate-reactive component: | |
| Water | 1.22 pbw |
| Niax A-1 | 0.1 pbw |
| Density (ISO 1855) | 72 kg/m³ |

| Compression Hardness | |
|---|---|
| CV 40% (ISO 3386) | 15 kPa |

Example 6

| Isocyanate component: | |
|---|---|
| MDI-Polyisocyanate A | 90 pbw |
| Polyisocyanate G | 10 pbw |
| Isocyanate-reactive component: | |
| Water | 3.8 |
| Niax A-1 | 0.15 |
| Dabco 33LV | 0.05 |
| SC-104 | 0.10 |
| DELA | 0.5 |

A good flexible foam of 33 kg/m³ density was obtained.

Example 7

MDI-Polyisocyanate A, MDI-Polyisocyanate B, MDI-Polyisocyanate C, water, NIAX A-1, DABCO-33LV, Tegostab 4113 and diethanolamine were fed from commercially available equipment including individual holding tanks each equipped with a metering pump and preheater into a mixing device manufactured by Viking PTI Ltd as Model No. TC1167 according to the proportions as outlined in Example 1.

The elongated cylindrical mixing head employed has an I.D. of 10 cms, and a length of 50 cms with centrally mounted rotating shaft having sixty two 0.8 cm O.D. high shear mixing blades mounted 2 centimetres apart along the length of the 40 centimetre shaft. Entrance ports are positioned 2.5 cms from the top of the mixing end of the container. Additives are fed in to the mixing zone through feed ports located 13 cms below the prepolymer and isocyanate feed ports.

A cream exit port of 5 cms I.D. is centrally located at the bottom of the cylinder. The water feed port is positioned in the side wall at a position 15 cms below the isocyanate feed ports.

In operation with a shaft rotating speed of 3000 RPM, the total feed weight of the ingredients entering the mixing device ranges from 100–150 kg/min. to adjust a holdup time in the isocyanate mixing zone at 400 to 269 microseconds prior to entering the formation zone for the creaming mixture, where the holdup time is 1.5 to 0.8 seconds.

The creaming mixture is fed from the mixing device to a creaming and/or foaming zone to produce flexible foam mouldings or flexible slabstock foam.

We claim:

1. A method for the preparation of a flexible polymeric foam characterized in that 100 parts by weight of polyisocyanate component are reacted with from 1–20 parts by weight of an isocyanate-reactive component comprising at least 40% by weight of water, by
    a) continuously or semi-continuously feeding at least two polyisocyanate components, at least one of which is an isocyanate containing prepolymer having an NCO content of from 2 to 15% by weight and at least another one having an NCO content of at least 20% by weight comprising a mixture of toluyene diisocyanate and diphenylmethane diisocyanate (MDI) and/or polymeric MDI, from different storage tanks using appropriate liquid metering pumps as separate streams into a mixing zone, b) continuously or semi-continuously forming a homogeneous mixture of these polyisocyanate components, then c) continuously or semi-continuously mixing said polyisocyanate blend with said isocyanate-reactive component to form a creaming mixture, and d) continuously or semi-continuously placing said creaming mixture on a foaming surface.

2. A method according to claim 1, characterized in that 100 parts by weight of polyisocyanate component are reacted with 1–10 parts by weight of isocyanate-reactive component comprising at least 50% by weight of water.

3. A method according to claim 1 wherein the isocyanate-reactive component has an average nominal functionality of 2 to 6 and an average equivalent weight in the range from 750 to 5000.

4. A method according to claim 1 wherein the second polyisocyanate composition comprises a mixture of a diphenylmethane diisocyanate composition, and a toluene diisocyanate composition having an NCO content of at least 25% by weight.

5. A method according to claim 1 wherein the feed of each polyisocyanate component is separately adjustable so that the respective amounts of these components can be varied for mixing with the isocyanate-reactive component as desired.

6. A method for the preparation of a flexible polymeric foam characterized in that 100 parts by weight of polyisocyanate component are reacted with 1–20 parts by weight of an isocyanate-reactive component comprising at least 40% by weight of water, by a) continuously feeding at least two polyisocyanate components, at least one of which is an isocyanate containing prepolymer having an NCO content of from 2 to 15% by weight and at least another one having an NCO content of at least 20% by weight comprising a mixture of toluene diisocyanate and diphenylmethane diisocyanate (MDI) and/or polymeric MDI, from different storage tanks using appropriate liquid metering pumps as separate streams into a mixing zone, b) continuously forming a homogeneous mixture of these polyisocyanate components, then c) continuously mixing said polyisocyanate blend with said isocyanate-reactive component to form a creaming mixture, and d) continuously placing said creaming mixture on a foaming surface.

7. A method according to claim 6 wherein the feed of each polyisocyanate component is separately adjustable so that the respective amounts of these components can be varied for mixing with the isocyanate-reactive component as desired.

8. A method for the preparation of a flexible polymeric foam characterized in that 100 parts by weight of polyisocyanate component are reacted with from 1–20 parts by weight of an isocyanate-reactive component comprising at least 40% by weight of water, by a) a feeding at least two polyisocyanate components, at least one of which is an isocyanate containing prepolymer having an NCO content of from 2 to 15% by weight and at least another one having an NCO content of at least 20% by weight comprising a mixture of toluene diisocyanate and diphenylmethane diisocyanate (MDI) and/or polymeric MDI, from separate storage tanks into a mixing zone which storage tanks are connected to said mixing zone, b) forming a homogeneous mixture of these polyisocyanate components and feeding the mixture into a reaction zone which is connected to said mixing zone, then c) mixing said polyisocyanate blend with said isocyanate-reactive component to form a creaming mixture, and d) placing said creaming mixture on a foaming surface.

9. A method for the preparation of a flexible polymeric foam, characterized in that 100 parts by weight of a polyisocyanate component are reacted with from 1 to 20 parts by weight of an isocyanate-reactive component comprising at least 40% by weight of water, wherein the polyisocyanate component comprises at least two polyisocyanate compositions, one of them being an isocyanate-terminated prepolymer having an NCO content of from 2 to 15% by weight and the second one being a polyisocyanate comprising a mixture of toluene diisocyanate and diphenylmethane diisocyanate (MDI) and/or polymer MDI, having an NCO content of at least 20% by weight, wherein said two polyisocyanate compositions are fed from different storage tanks connected to a mixing zone.

10. A method according to claim 8 characterized in that 100 parts by weight of polyisocyanate component are reacted with 1–10 parts by weight of isocyanate-reactive component comprising at least 50% by weight of water.

11. A method according to claim 9, wherein the isocyanate-reactive component has an average nominal functionality of 2 to 6 and an average equivalent weight in the range from 750 to 5000.

12. A method according to claim 9, wherein the second polyisocyanate composition comprises a mixture of a diphenylmethane diisocyanate composition and a tolylene diisocyanate composition having an NCO content of at least 25% by weight.

* * * * *